(12) United States Patent
Baker (10) Patent No.: US 9,479,762 B2
(45) Date of Patent: Oct. 25, 2016

(54) STEREOSCOPIC VIDEO TEMPORAL FRAME OFFSET MEASUREMENT

(75) Inventor: Daniel G. Baker, Beaverton, OR (US)

(73) Assignee: TEKTRONIX, INC., Beaverton, OR (US)

( * ) Notice: Subject to any disclaimer, the term of this patent is extended or adjusted under 35 U.S.C. 154(b) by 1028 days.

(21) Appl. No.: 13/310,972

(22) Filed: Dec. 5, 2011

(65) Prior Publication Data

US 2013/0141528 A1    Jun. 6, 2013

(51) Int. Cl.
*H04N 13/00* (2006.01)
*H04N 13/02* (2006.01)

(52) U.S. Cl.
CPC ...... *H04N 13/0296* (2013.01); *H04N 13/0051* (2013.01); *H04N 2013/0096* (2013.01)

(58) Field of Classification Search
None
See application file for complete search history.

(56) References Cited

U.S. PATENT DOCUMENTS

| | | | |
|---|---|---|---|
| 6,751,360 B1* | 6/2004 | Lu | 382/278 |
| 2004/0205570 A1* | 10/2004 | Tonomura | 715/513 |
| 2008/0260023 A1* | 10/2008 | Sung | 375/240.03 |
| 2008/0312906 A1* | 12/2008 | Balchandran et al. | 704/9 |
| 2010/0064001 A1* | 3/2010 | Daily | 709/203 |
| 2010/0110163 A1* | 5/2010 | Bruls et al. | 348/43 |
| 2010/0166300 A1* | 7/2010 | Spampinato et al. | 382/162 |
| 2011/0037829 A1* | 2/2011 | Hata | 348/43 |
| 2011/0096173 A1* | 4/2011 | Baker | 348/192 |
| 2011/0242286 A1* | 10/2011 | Pace et al. | 348/47 |
| 2011/0261257 A1* | 10/2011 | Terry et al. | 348/515 |
| 2012/0033817 A1* | 2/2012 | Francois | G10L 19/008 381/2 |

FOREIGN PATENT DOCUMENTS

| | | |
|---|---|---|
| EP | 1727376 A2 | 11/2006 |
| EP | 2315455 A2 | 4/2011 |

OTHER PUBLICATIONS

Radhakrishnan et al. ("Audio and Video Signatures for Synchronization," Multimedia and Expo, 2008 IEEE International Conference ON, IEEE, Piscataway, NJ, USA, Jun. 23, 2008, pp. 1549-1552, XP031313030).*
European Search Report from EP No. 12195699.9, dated May 3, 2013, 9 pages.

* cited by examiner

*Primary Examiner* — Joseph Ustaris
*Assistant Examiner* — Edemio Navas, Jr.
(74) *Attorney, Agent, or Firm* — Michael A. Nelson; Marger Johnson (57) ABSTRACT

A stereoscopic video temporal frame offset measurement system uses an improved signature curve generator to generate a robust signature curve for each of the left and right image sequences of a stereo video signal. The resulting signature curves are cross-correlated over a specified correlation range to generate cross-correlation coefficients. The cross-correlation coefficients are compared to a high threshold, and a temporal frame offset is generated and displayed for each cross-correlation coefficient that exceeds the high threshold. Each new temporal frame offset result is highlighted when displayed, otherwise the last result is displayed in a background fashion.

17 Claims, 6 Drawing Sheets

STEREOSCOPIC VIDEO TEMPORAL FRAME OFFSET MEASUREMENT

BACKGROUND OF THE INVENTION

The present invention relates to three-dimensional (3D) television (TV) video processing, and more particularly to the measurement of stereoscopic video temporal frame offset.

Stereoscopic three-dimensional television (3DTV) video is a sequence of stereoscopic frame-pairs. One of the frames in each frame-pair is intended for viewing by the Left Eye only, and the other frame is intended for viewing by the Right Eye only. In this manner the binocular vision of the frame-pair creates the stereoscopic illusion of depth along with the traditional image height and width. These frame-pairs may be separate video streams of the Left Eye (L) image frames and the Right Eye (R) image frames. Each stream is generally taken from a 3D camera system that is really two cameras with separate video outputs to produce a serial digital dual link. It is desirable that the two cameras are synchronized so that the L and R frame-pairs are captured at the same time.

These dual-link outputs may be sent as separate compressed video streams to a location where the image pairs are combined with one of several methods to produce a single stream for distribution. Each stream may be compressed with a separate coder/decoder (CODEC), one for the L image sequence and one for the R image sequence. However each CODEC often has an undetermined frame delay or processing latency. As a result the decompressed output sequence of L and R frames may no longer be pair-wise, frame synchronous, i.e., there may be one or more frames of temporal miss-alignment or temporal frame offset.

U.S. Pat. No. 6,751,360, issued Jun. 15, 2004 to Jiuhuai Lu and assigned to Tektronix, Inc. of Beaverton, Oreg. and incorporated herein by reference, describes a fast temporal alignment estimation method for temporally aligning a distorted video signal with a corresponding source video signal. A temporal signal curve (SC) is created for each of the video signals, and the resulting SCs are cross-correlated with each other to determine a match between corresponding frames of the two video signals. The maximum cross-correlation result is an indication of the amount of temporal displacement between corresponding frames of the two video signals. However the resulting SC, as shown by the SC graph of FIG. 1a, has a large offset. The large offset does not allow robust determination of the frame offsets from the SCs and requires a large bit-size for digital integer implementation in hardware (HW).

What is desired is a method, without any a priori knowledge of video content, of measuring the frame offset or L to R temporal miss-alignment, which measurement provides a robust indication of any uncorrected temporal frame offset between the L and R image sequences.

BRIEF SUMMARY OF THE INVENTION

Accordingly the present invention provides a stereoscopic video temporal frame offset measurement technique that is robust, and does not require any a priori knowledge of video content. The stereoscopic video temporal frame offset measurement system uses an improved signature curve generator to generate a robust signature curve for each of the left and right image sequences of a stereo video signal. The resulting signature curves are cross-correlated over a specified correlation range to generate cross-correlation coefficients. The cross-correlation coefficients are compared to a high threshold, and a temporal frame offset is generated and displayed for each cross-correlation coefficient that exceeds the high threshold. Each new, reliable temporal frame offset result is highlighted when displayed, otherwise the last result is displayed in a background fashion.

The objects, advantage and other novel features of the present invention are apparent from the following detailed description when read in conjunction with the appended claims and attached drawing figures.

DETAILED DESCRIPTION OF THE INVENTION

Figure 1:
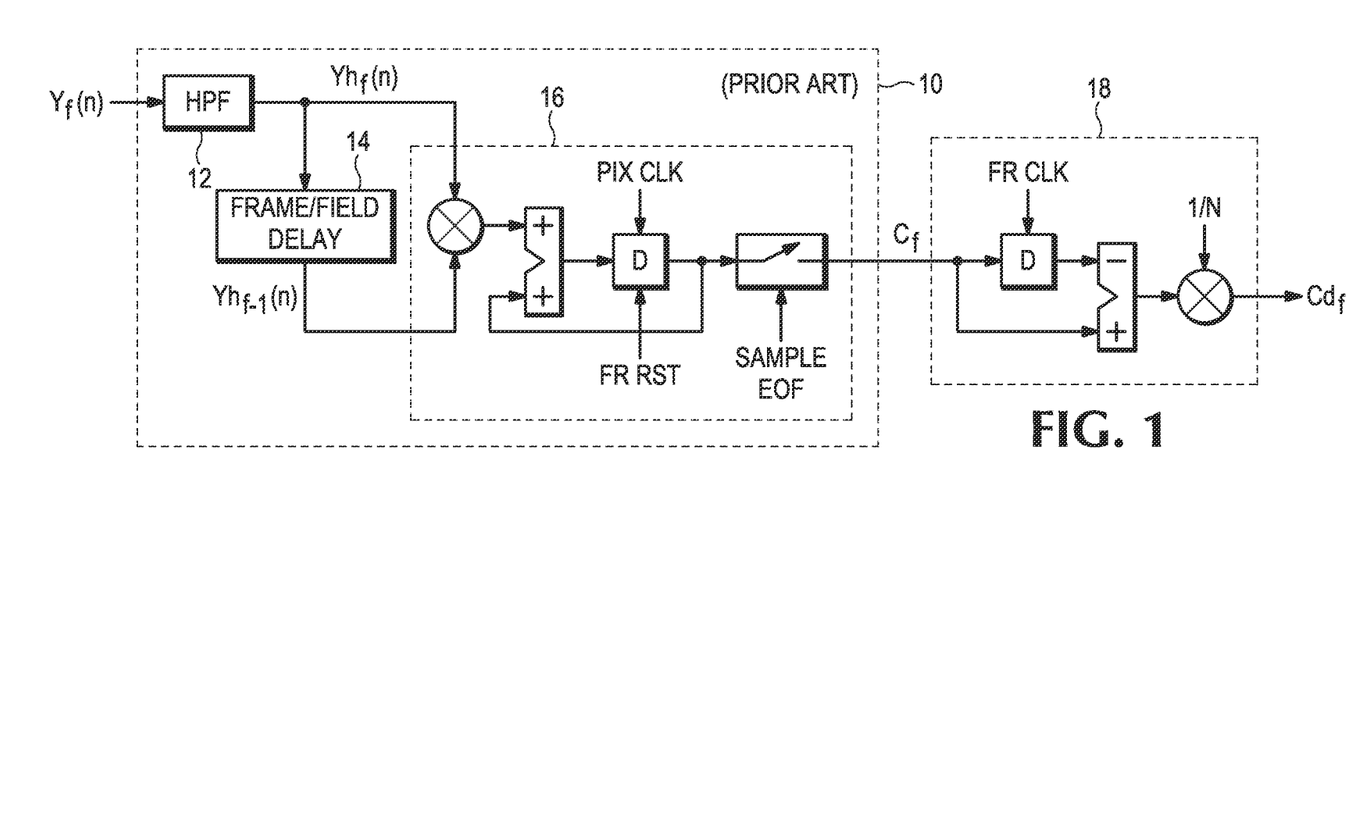
FIG. 1 provides a block diagram view of an improved signature curve generator for the measurement of stereoscopic video temporal frame offset according to the present invention.
Figure 1A:
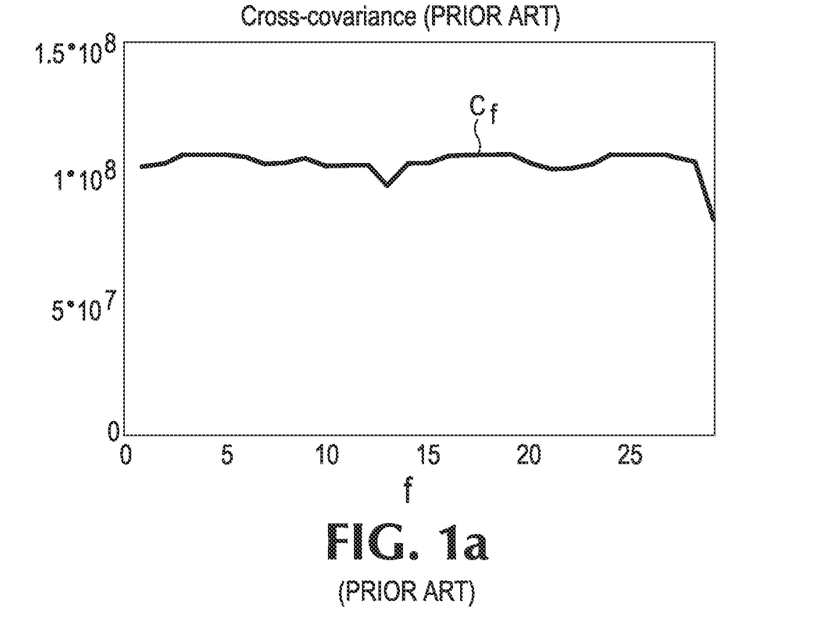
Figure 1B:
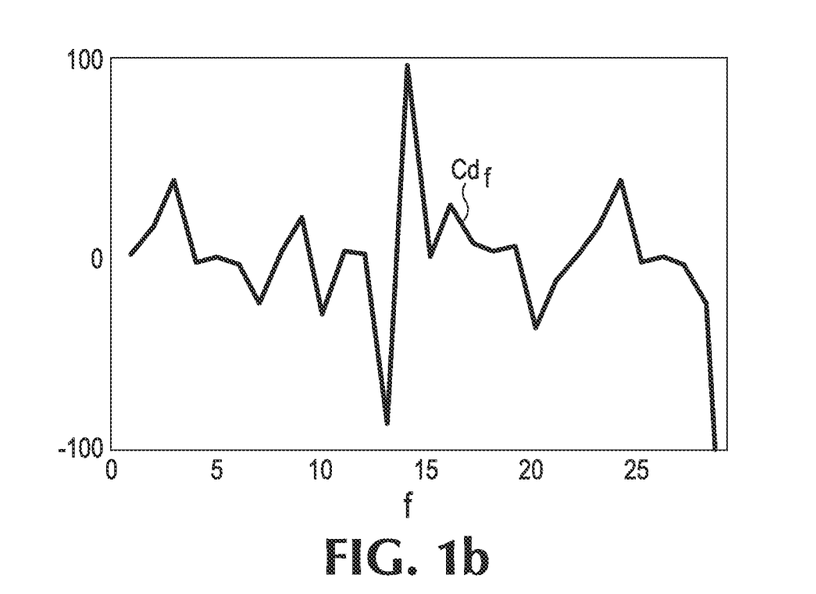

Referring now to FIG. 1, a sequence of luminance images, $Y_f(n)$, is input to a temporal signature curve ($C_f$) generator 10 to produce a frame-to-frame cross-variance output as described in the above-mentioned U.S. Pat. No. 6,752,360. The luminance sequence is input to a high-pass filter (HPF) 12 to produce a sequence of high-pass filtered luminance images, $Yh_f(n)$, which in turn is input to a frame/field delay circuit 14 that provides an output sequence of luminance images, $Yh_{f-1}(n)$, that are delayed by one frame/field. The two resulting sequences of luminance images are input to a multiply-accumulate circuit 16 effecting an un-normalized cross-correlation, also known as a co-variance measure, to produce the SC, $C_f$, according to the prior art, and which is graphed as FIG. 1a. As described previously, at this point the SC has a large offset so that variations are not readily discernible. Therefore SC is further processed by a differentiator 18 that provides a normalized first-past difference, $Cd_f$, of the frame-to-frame cross-correlation, $C_f$, a graph of which is shown in FIG. 1b. For the purpose of comparison, $Cd_f$ is normalized by the number of frames, N, as shown in FIG. 1b. It is apparent by comparing the two graphs of FIGS. 1a and 1b that now variations are readily apparent, i.e., the dynamic range of the SC is significantly reduced and the AC content is increased.

Figure 2A:
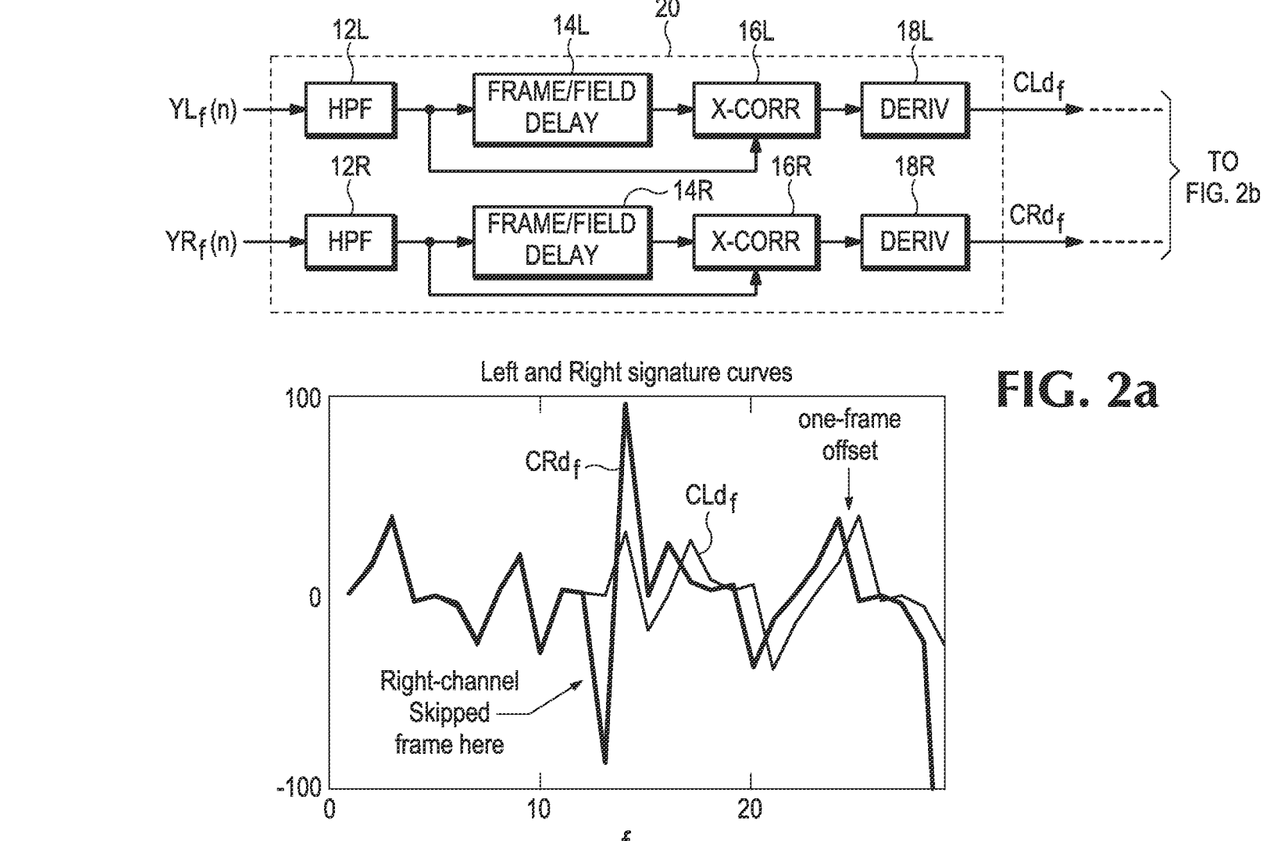
FIG. 2 provides a block diagram view of the system for stereoscopic view temporal frame offset measurement according to the present invention.
Figure 2B:
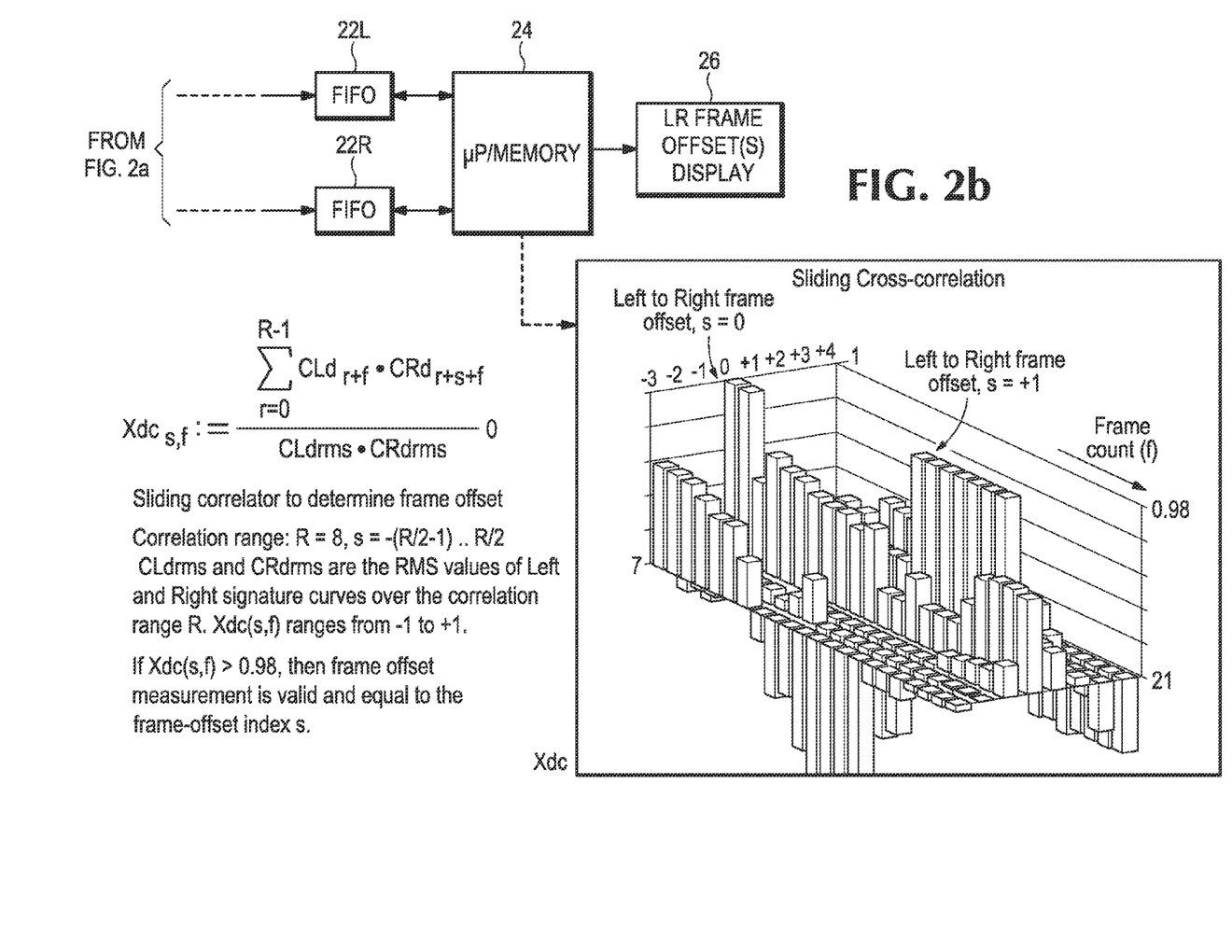

Referring now to FIG. 2, using the improved SC generator of FIG. 1, luminance component pixels, $YL_f(n)$ and $YR_f(n)$, of a stereoscopic image pair are applied to a dual SC generator 20 to produce the first-past differences, $CLd_f$ and $CRd_f$. Each pixel, indexed by n, of the input and output frame/field of the frame/field delay 14 is then cross-correlated, without normalization to the individual standard deviations, by the multiply-accumulate circuit 16 to produce the covariance measure of the frame difference of each input frame, indexed by f, and the previous frame, indexed by f−1. This is done separately on the left and right input frame sequences, $YL_f(n)$ in the left sequence frame/field delay 14L and multiply-accumulate circuit 16L, and YR$_f$(n) in the right sequence frame/field delay 14R and multiply-accumulate circuit 16R. The resulting covariance values for each left frame, indexed by f, from the left multiply-accumulate circuit 16L are then differentiated by differentiator 18L to produce signature curve values, CLd$_f$. Likewise the resulting co-variance values for each right frame, indexed by f, from the right multiply-accumulate circuit 16R are differentiated by the differentiator 18R to produce signature curve values, CLd$_f$. This signature curve process is preferably implemented in hardware to allow processing in real time.

The improved temporal signal curves of the L and R image sequences, as discreet values at the sequence framerate, are shown superimposed in the graph shown in FIG. 2. As indicated in this instance as an example, at frame 12 the right channel skipped a frame so the signature curves are not synchronous, i.e., after the frame skip there is a one frame offset between the two channels.

The respective first-past differences are input to respective first-in/first-out (FIFO) buffers 22L, 22R having a length equal to twice a specified correlation range R. The outputs from the FIFO buffers 22 are available to a typical microprocessor and memory system 24. The microprocessor and memory system 24 computes a sliding correlation, as illustrated in FIG. 2. The microprocessor 24 reads past samples of CLd and CRd from the FIFO buffers 22 within the real-time frame processing hardware after a sufficient record of frame-rate samples have been acquired. The record length, as indicated above, is 2×R, where R is the correlation computation range and offset detection range, as shown in the equation of FIG. 2.

The root mean square (rms) values over the correlation range R of the respective CLd and CRd are used in the denominator of the shown equation to create a normalized correlation coefficient ranging from −1 to +1. Therefore there is the possibility that, within the given computation range R, all the frames are still frames, i.e., are identical, so that the rms value of that section of the signature curve approaches zero. To avoid this situation, the microprocessor 24 tests the rms values against a minimum value, and disregards the set of frames over the correlation range R where the rms values are less than the minimum value.

The equation shown in FIG. 2 computes a correlation coefficient, Xdc(s,f), over the range R for several frame offsets, s, to determine the best estimate of the offset between the two signature curves, CLd(f) and CRd(f). In the example shown, the range of offsets, s, is from −3 to +4 frames, and the correlation range, R, is 8. However a longer correlation range (>8) may be used to get more accuracy in the computation of Xdc(s,f). Also common methods of interpolation or sample up-conversion of CLd(f) and CRd(f) may be used prior to correlation to achieve higher time resolution to fractions of a frame/field time. The value of Xdc for each offset, s, is tested to see if it is above a certain threshold, typically above 0.98. If the value of Xdc is above the threshold, then a reliable indication of the L to R frame offset has been found and the value of the corresponding offset, s, is displayed on an instrument display screen 26. In the given example the value of LR Frame Offset is +1, which value is displayed. For each calculated LR Frame Offset, the resulting offset, s, is highlighted, if found to be reliable, to indicate that an update has occurred. If the readout is not updated, then the readout displayed is shown in gray or otherwise not highlighted to indicate that the last good value is shown without a recent update. Every time a new frame, f, is added to the FIFO buffers 22, the oldest value is discarded and the computation of Xdc(s,f) is repeated and, if a value above the threshold is found, the readout is again updated with this reliable value and highlighted on the display 26.

It may also be preferable to graph the resulting updated frame offset, s, over time to create a record of the L to R image sequence temporal offset over long periods. This allows time-stamping or alarming of intervals where the temporal misalignment exceeds a pre-determined threshold for an unacceptably long period.

Although hardware implementation is preferable, the complete process may be implemented and tested in software (SW). From such testing, the threshold value and correlation range of the example shown were determined, although other values may be used.

Figure 3:
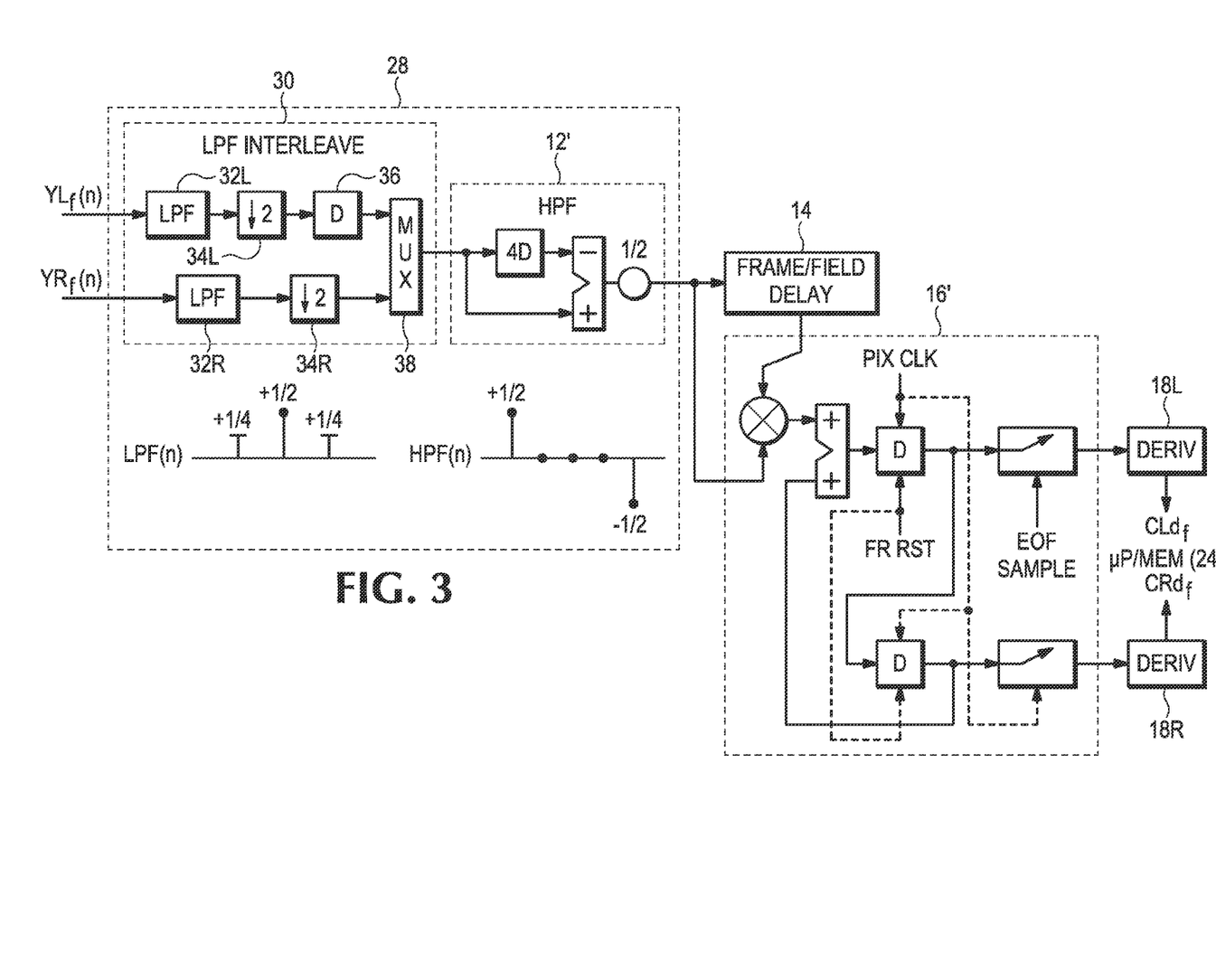
FIG. 3 provides a block diagram view of the signature curve generator having reduced hardware requirements according to the present invention.

To reduce the required HW, the YL(n) and YR(n) pixels from the L and R image sequences may be decimated by two and interleaved into a single sample stream, as illustrated in FIG. 3. The pixels from the respective image sequences are input to respective low pass filters (LPF) 32L, 32R of a low pass filter and interleave circuit 30, which is part of an input filter circuit 28. The outputs from the respective LPFs 32 are input to respective decimators 34L, 34R, with one of the outputs from the decimators being delayed one pixel interval by a delay circuit 36. The outputs from the un-delayed decimator 34R and the delay circuit 36 are input to a multiplexer 38 to produce a single pixel stream having interleaved L and R image sequence pixels. The resulting single pixel stream is then input to a high pass filter (HPF) 12' to remove the DC or luminance-mean component before input to the frame/field delay 14. The input and output from the frame/field delay 14 are input to a modified multiply-accumulate circuit 16' to effect a cross-correlation, producing respective CL$_f$ and CR$_f$ streams that are input to the respective differentiators 18 to produce the same SC outputs as shown in FIG. 2. The single multiply-accumulate circuit 16' is now effectively a cross-covariance detector, since the result is not normalized by the frame rms values.

Due to the interleaving in FIG. 3, the separate HPF filtered L and R luminance pixels are independently accumulated for the cross-covariance between temporally adjacent frames or fields, then differentiated and normalized into the desired SC values for input to the microprocessor 24 shown in FIG. 2.

Figure 4:
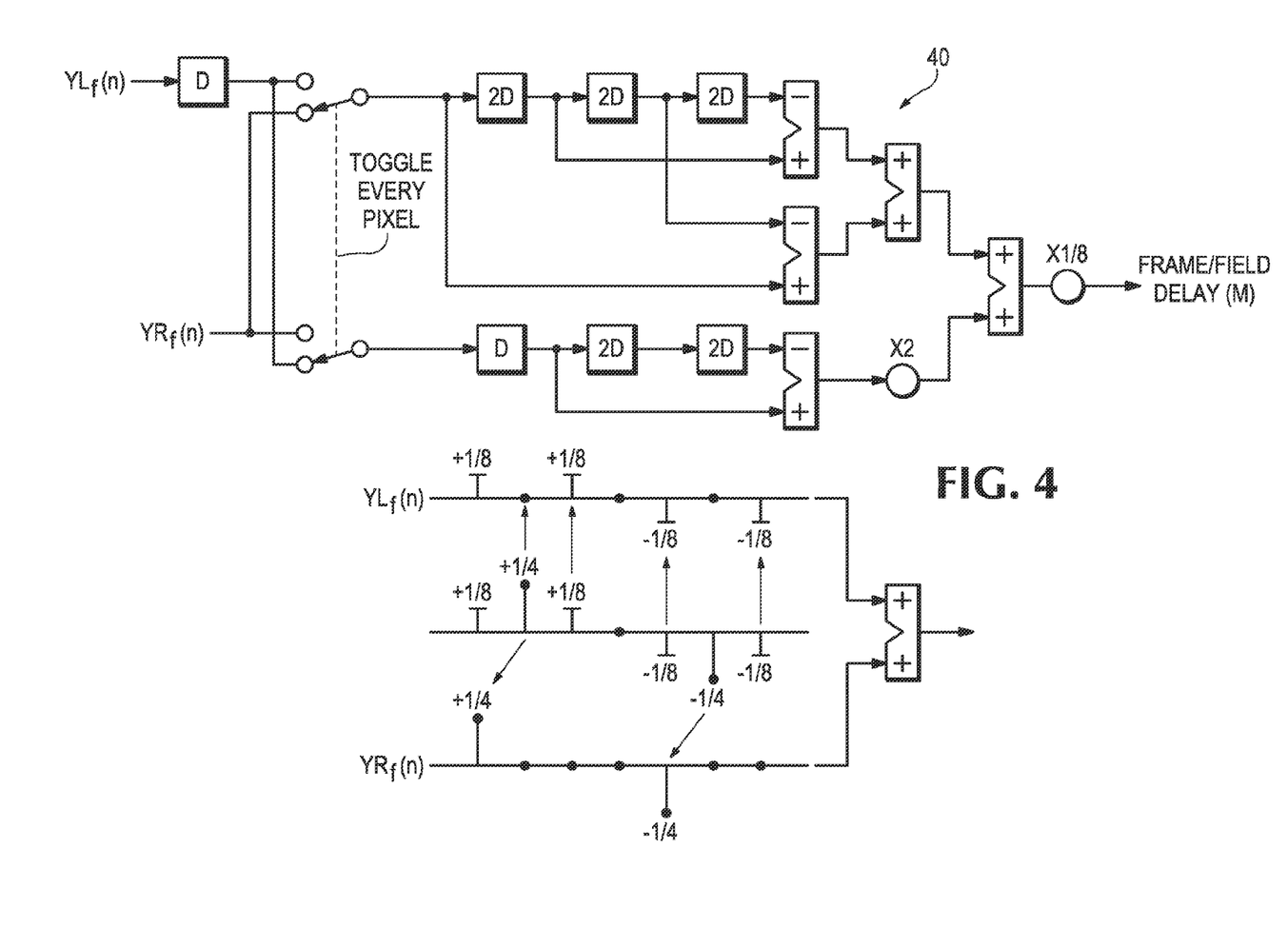
FIG. 4 provides a block diagram view of an input filter for further reducing the hardware requirement according to the present invention.

Further simplification of the HW may be done by combining the LPF, interleaving and HPF filtering 30, 12' as shown in FIG. 4. The impulse responses of the LPFs 32 and HPF 12' may be combined, or convolved, into a single impulse response. The result then may be decomposed into a two-phase implementation and selection multiplexer, creating the desired total horizontal frequency response for each luminance component YL(n) and YR(n). The output is the interleaved and decimated luminance values with the combined LPF and HPF horizontal frequency response which is then input to the single frame/field delay 14. The upper portion of FIG. 4 shows a detailed block diagram of the combined polyphase interleaver finite impulse response (FIR) filter 40, while the bottom view shows how the convolved LPF and HPF impulse responses are decomposed into separate, simplified, processing paths in the combined polyphase interleaver FIR filter.

Thus the present invention provides a stereoscopic video time frame offset measurement system using an improved signature curve generator to produce signature curves for left and right image sequences, which signature curves are then correlated with each other to determine time frame offsets between the two image sequences.

What is claimed is:

1. A stereoscopic video temporal frame offset measurement system comprising:
a signature generator having as an input a left image sequence and a right image sequence representing a stereo video signal, and providing as an output a signature curve for each of the left and right image sequences;
a microprocessor system configured to cross-correlate the signature curves for the left and right image sequences to determine a temporal frame offset between the left and right image sequences;
at least one multiply-accumulate circuit configured to:
receive a filtered single data stream including filtered left and right image components interleaved from the left and right image sequences, and
cross-correlate sequential frames/fields of each of the left and right image sequences to produce respective cross-correlation coefficients; and
at least one differentiator configured to provide sequential cross-correlation coefficients within each of the left and right image sequences by dividing the sequential cross-correlation coefficients by the number of frames to produce a normalized first-past difference between the sequential cross-correlation coefficients for each of the left and right image sequences as the respective signature curves for the left and right image sequences for input to the microprocessor system.

2. The measurement system as recited in claim 1 further comprising a screen configured to display the temporal frame offset, highlighting the temporal frame offset each time the temporal frame offset is updated by the microprocessor system while retaining a latest value of the temporal frame offset between such updates.

3. The measurement system as recited in claim 1 wherein the microprocessor system comprises:
a first-in, first-out buffer for each of the signature curves, the first-in, first-out buffer having as an input the signature curve and having an output; and
a microprocessor having as inputs the outputs from the first-in, first-out buffers and providing as an output the temporal frame offset, the microprocessor system performing a sliding cross-correlation between the inputs to produce the temporal frame offset.

4. The measurement system as recited in claim 1 wherein the signature generator comprises:
a low pass filter for filtering each of the left and right image sequences to produce respective low pass filtered image sequences;
an interleaving circuit for alternate the low pass filtered image sequences to produce a single data stream representing the left and right image sequences; and
a high pass filter for high pass filtering the single data stream to produce the filtered single data stream.

5. The measurement system as recited in claim 1 wherein the signature generator comprises:
a combined polyphase interleaver finite impulse response filter corresponding to a low pass filter, an interleaver and a high pass filter, the combined polyphase interleaver finite impulse response filter having the left and right image sequences as inputs and having a single data stream as an output,
wherein the multiply-accumulate circuits cross-correlate the left and right image components from the single data stream to produce the respective signature curves for input to the microprocessor system.

6. A method of measuring stereoscopic video temporal frame offset comprising the steps of:
receiving left and right image sequences as inputs to a polyphaser interleaver finite impulse response filter, the left and right image sequences forming a stereoscopic video sequence;
outputting, from the polyphaser interleaver finite impulse response filter, a filtered single data stream comprising filtered left and right image components interleaved from the left and right image sequences;
generating from the filtered left image components in the filtered single data stream a robust left signature curve;
generating from the filtered right image components in the filtered single data stream a robust right signature curve;
cross-correlating the left and right robust signature curves to determine a temporal frame offset between the left and right image sequences;
cross-correlating each image sequence with its corresponding delayed image sequence to produce respective initial signature curves; and
differentiating each initial signature curve by dividing the sequential cross-correlation coefficients by the number of frames to produce respective normalized first-past differences as the respective left and right robust signature curves.

7. The method as recited in claim 6 wherein the generating steps each comprise the steps of:
delaying each image sequence by a specified number of frames/fields to produce respective delayed image sequences.

8. The method as recited in claim 6 further comprising the step of displaying the temporal frame offset on a display device.

9. The method as recited in claim 8 wherein the displaying step comprises the step of highlighting the temporal frame offset on the display device each time the temporal frame offset from the cross-correlating step is updated, while displaying a prior temporal frame offset in a background mode on the display device between updates.

10. The method as recited in claim 6 wherein cross-correlating each image sequence with its corresponding delayed image sequence comprises sliding cross-correlation over a specified range of the robust left and right signature curves.

11. A stereoscopic video temporal frame offset measurement system comprising:
a temporal signature curve generator having as inputs a left image sequence and a right image sequence, the left and right image sequences representing frame/field-pairs for a stereoscopic video signal, and having as outputs a left signature curve and a right signature curve, each signature curve being a sequence of cross-correlation coefficient values representing normalized first-past differences from frame/field-to-frame/field; and
a processing system having as inputs the left and right signature curves, providing as an output a temporal frame offset value representing a temporal difference between the frame/field-pairs of the left and right image sequences, and including:
a pair of first-in/first-out (FIFO) buffers, one for each of the left and right signature curves, each FIFO buffer having the signature curve as an input with a length sufficient for storing a segment of the signature curve at a time and having an output, and a processor having as inputs the outputs from the FIFO buffers, the processor providing a sliding cross-correlation between the outputs of the FIFO buffers to produce a plurality of correlation results, and producing as an output the temporal frame offset value corresponding to the correlation result that exceeds a specified high threshold value.

12. The measurement system as recited in claim 11 wherein the temporal signature curve generator comprises a pair of signature curve generators, one for each of the left and right image sequences, each signature curve generator having a frame/field delay to which the image sequence is input to produce a delayed image sequence, having a multiplier-accumulator with the image sequence and delayed image sequence as inputs and an initial sequence of cross-correlation coefficients as an output, and having a differentiator with the initial sequence of cross-correlation coefficients as an input and the signature curve as an output.

13. The measurement system as recited in claim 11 further comprising a display having as an input the temporal frame offset value from the processing system.

14. The measurement system as recited in claim 13 wherein the temporal frame offset value is highlighted on the display when the temporal frame offset value is updated by the processing system and otherwise displayed in a background manner on the display.

15. The measurement system as recited in claim 11 wherein the temporal signature curve generator comprises:
   a filter/interleaver having as inputs the left and right image sequences and having an interleaved image sequence stream as an output;
   a frame/field delay having the interleaved image sequence stream as an input and having a delayed interleaved image sequence stream as an output;
   a modified multiplier-accumulator having the interleaved image sequence stream and the delayed interleaved image sequence stream as inputs and having initial left and right cross-correlation coefficients as outputs; and
   a pair of differentiators, one having the left cross-correlation coefficients as an input and the left signature curve as an output and the other having the right cross-correlation coefficients as an input and the right signature curve as an output.

16. The measurement system as recited in claim 15 wherein the filter/interleaver comprises:
   separate low pass filters, one for filtering the left image sequence and the other for filtering the right image sequence, for producing left and right filtered image sequences;
   an interleaving circuit configured to alternate the left and right filtered image sequences to form a single data stream; and
   a high pass filter for filtering the single data stream to produce the interleaved image sequence stream.

17. The measurement system as recited in claim 15 wherein the filter/interleaver comprises a polyphase interleaver finite impulse response (FIR) filter having as inputs the left and right image sequences and having as an output the interleaved image sequence stream for input to the frame/field delay.

* * * * *